(12) United States Patent
Habashi

(10) Patent No.: US 10,563,077 B2
(45) Date of Patent: Feb. 18, 2020

(54) INK SET, INK STORED CONTAINER, INKJET PRINTING METHOD, AND INKJET PRINTING APPARATUS

(71) Applicant: Hisashi Habashi, Kanagawa (JP)

(72) Inventor: Hisashi Habashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/761,612

(22) PCT Filed: Oct. 5, 2016

(86) PCT No.: PCT/JP2016/004494
§ 371 (c)(1),
(2) Date: Mar. 20, 2018

(87) PCT Pub. No.: WO2017/077687
PCT Pub. Date: May 11, 2017

(65) Prior Publication Data
US 2018/0346747 A1 Dec. 6, 2018

(30) Foreign Application Priority Data

Nov. 6, 2015 (JP) .................................. 2015-218825

(51) Int. Cl.
*B41J 2/135* (2006.01)
*B41J 2/21* (2006.01)
(Continued)

(52) U.S. Cl.
CPC .............. *C09D 11/40* (2013.01); *B41J 2/135* (2013.01); *B41J 2/2107* (2013.01); *C09D 11/322* (2013.01); *C09D 11/328* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,505,749 A 3/1985 Kanekiyo et al.
4,604,654 A * 8/1986 Sakurada ............... B41J 2/2125
347/43

(Continued)

FOREIGN PATENT DOCUMENTS

EP 0 738 767 A1 10/1996
EP 1 308 490 A1 5/2003
(Continued)

OTHER PUBLICATIONS

International Search Report dated Nov. 1, 2016 for counterpart International Patent Application No. PCT/JP2016/004494 filed Oct. 5, 2016.

(Continued)

*Primary Examiner* — Manish S Shah
(74) *Attorney, Agent, or Firm* — Oblon, McClelland, Maier & Neustadt, L.L.P.

(57) ABSTRACT

Provided is an ink set including at least two inks each including a coloring material, an organic solvent, and water, wherein a proportion of the organic solvent in each of the inks is 30 percent by mass or greater, wherein a relative mobility difference (maximum relative mobility−minimum relative mobility) between a maximum relative mobility and a minimum relative mobility among relative mobilities of the coloring materials included in the inks is 0.1 or greater, where the relative mobilities are obtained by thin-layer chromatography in which the coloring materials are developed using the organic solvents included in the inks as developing solvents.

15 Claims, 4 Drawing Sheets

(51) Int. Cl.
*C09D 11/40* (2014.01)
*C09D 11/328* (2014.01)
*C09D 11/322* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,477,248 A * | 12/1995 | Sugimoto | B41J 2/2107 347/100 |
| 5,560,766 A | 10/1996 | Gundlach | |
| 5,570,118 A * | 10/1996 | Rezanka | B41J 2/2107 347/100 |
| 5,749,951 A | 5/1998 | Yoshiike et al. | |
| 6,084,610 A | 7/2000 | Ozaki et al. | |
| 2003/0101904 A1 | 6/2003 | Morris et al. | |
| 2003/0112305 A1 | 6/2003 | Kato et al. | |
| 2005/0018012 A1 | 1/2005 | Iwasaki et al. | |
| 2005/0115458 A1 | 6/2005 | Oki et al. | |
| 2008/0030545 A1 | 2/2008 | Iijima | |
| 2009/0195579 A1 * | 8/2009 | Tousi | B41J 2/2125 347/14 |
| 2012/0328854 A1 | 12/2012 | Matsuyama et al. | |
| 2015/0116392 A1 | 4/2015 | Ohishi et al. | |

FOREIGN PATENT DOCUMENTS

| | | | | |
|---|---|---|---|---|
| GB | 2 187 469 A | | 9/1987 | |
| JP | 9-193529 A | | 7/1997 | |
| JP | 10-158551 A | | 6/1998 | |
| JP | 10158551 A | * | 6/1998 | ............ B41J 2/2107 |
| JP | 2003-96367 A | | 4/2003 | |
| JP | 2004-82624 A | | 3/2004 | |
| JP | 2005-1337 A | | 1/2005 | |
| JP | 3987962 B2 | | 7/2007 | |
| JP | 4778808 B2 | | 7/2011 | |
| JP | 2011-184518 A | | 9/2011 | |
| JP | 2012-6994 A | | 1/2012 | |
| JP | 5230084 B2 | | 3/2013 | |
| JP | 2013-181158 A | | 9/2013 | |
| JP | 2014-145045 A | | 8/2014 | |
| JP | 2014-148592 A | | 8/2014 | |
| JP | 2015-17187 A | | 1/2015 | |

OTHER PUBLICATIONS

Written Opinion dated Nov. 1, 2016 for counterpart International Patent Application No. PCT/JP2016/004494 filed Oct. 5, 2016.
Extended European Search Report dated Aug. 10, 2018 in Patent Application No. 16861765.2, 7 pages.
Japanese Office Action dated May 28, 2019 in Patent Application No. 2015-218825, 8 pages.

* cited by examiner

[Fig. 1]
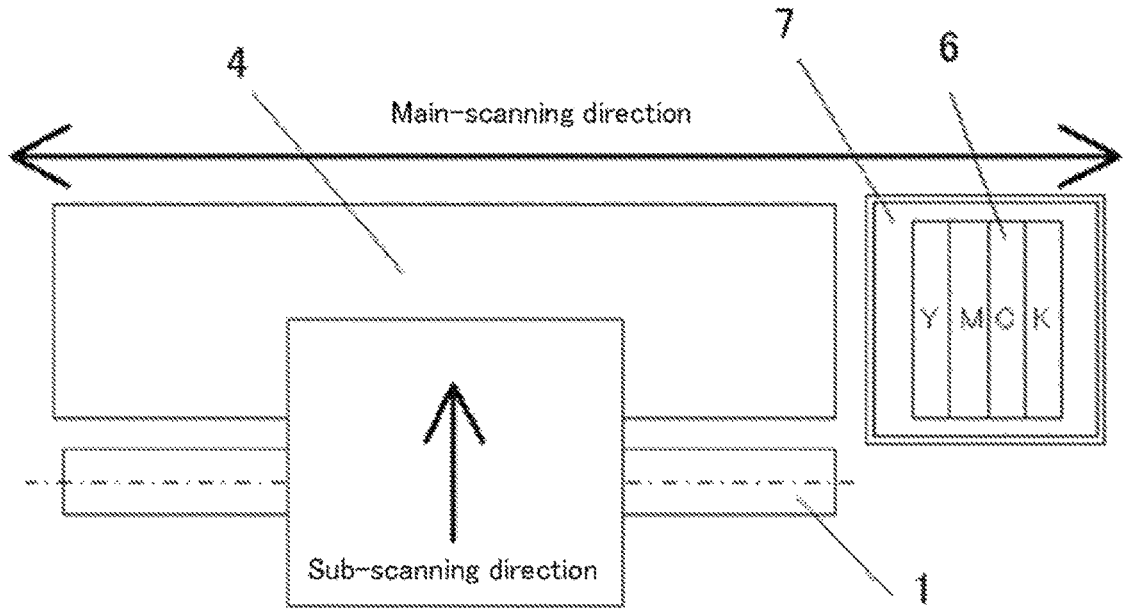
[Fig. 2]
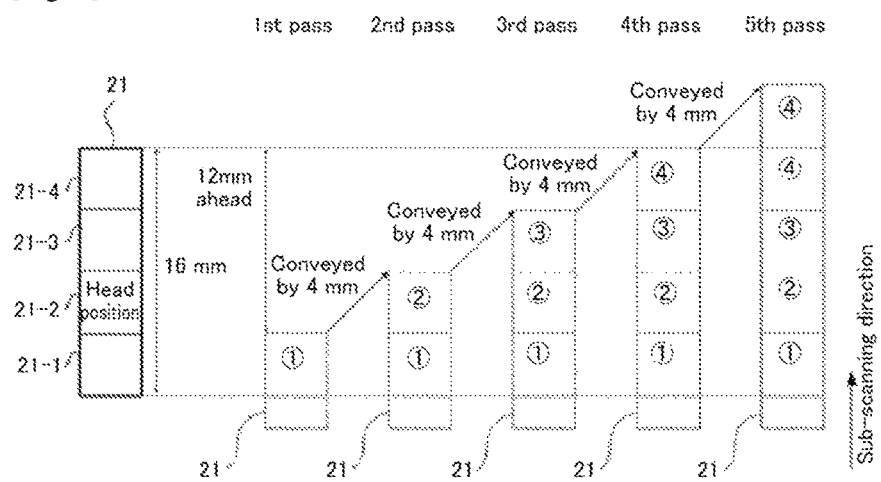
[Fig. 3]
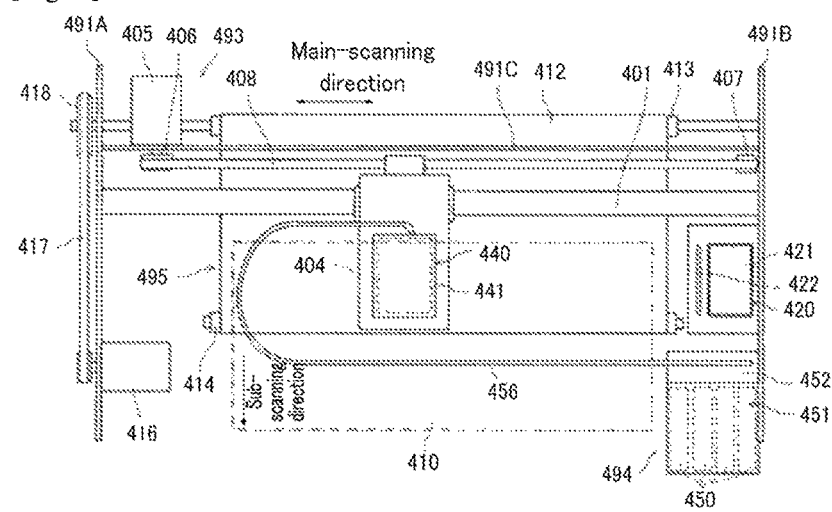

[Fig. 4]
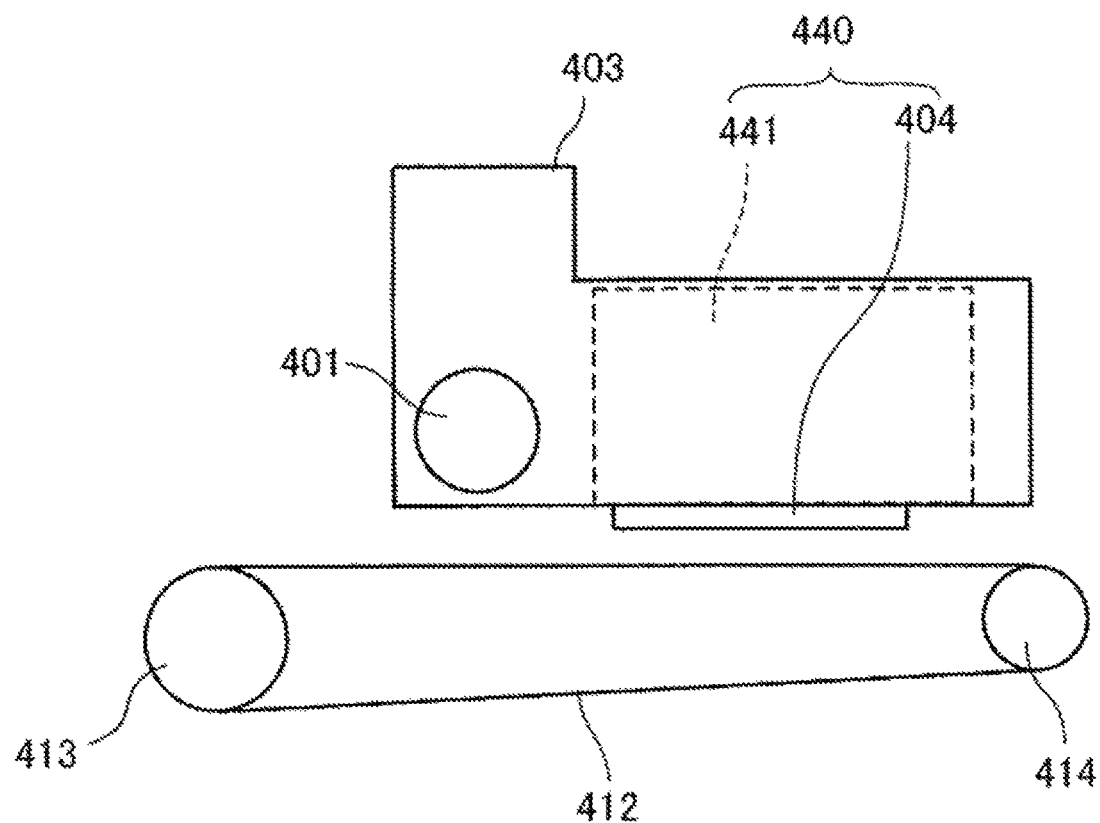

[Fig. 5]
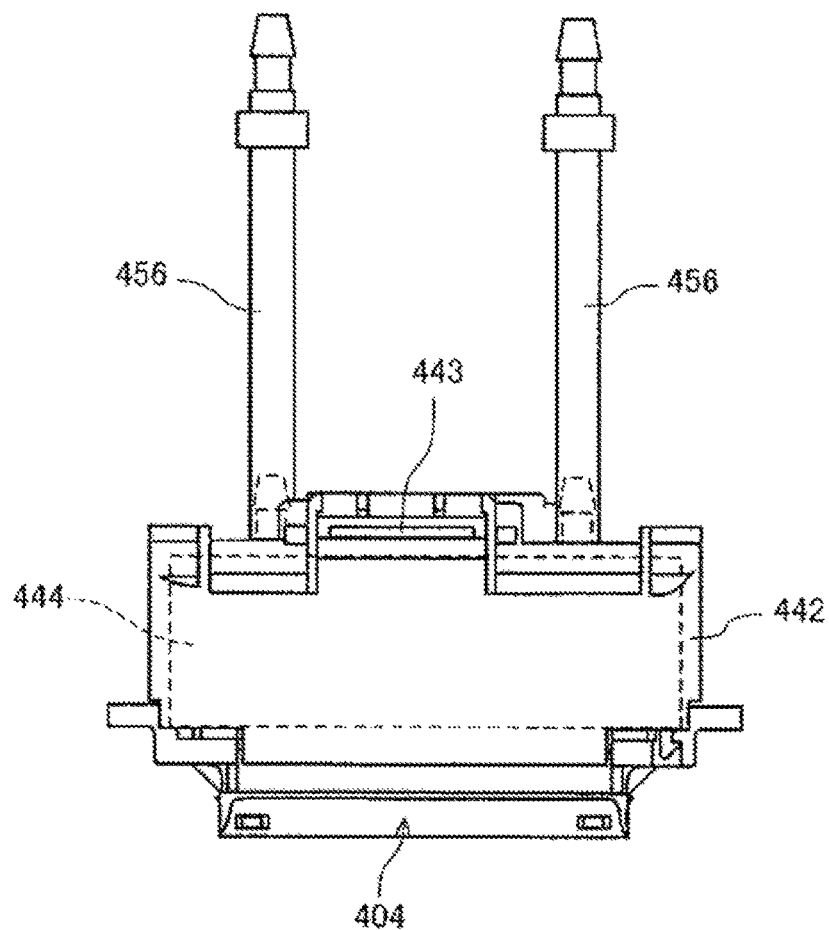
[Fig. 6]
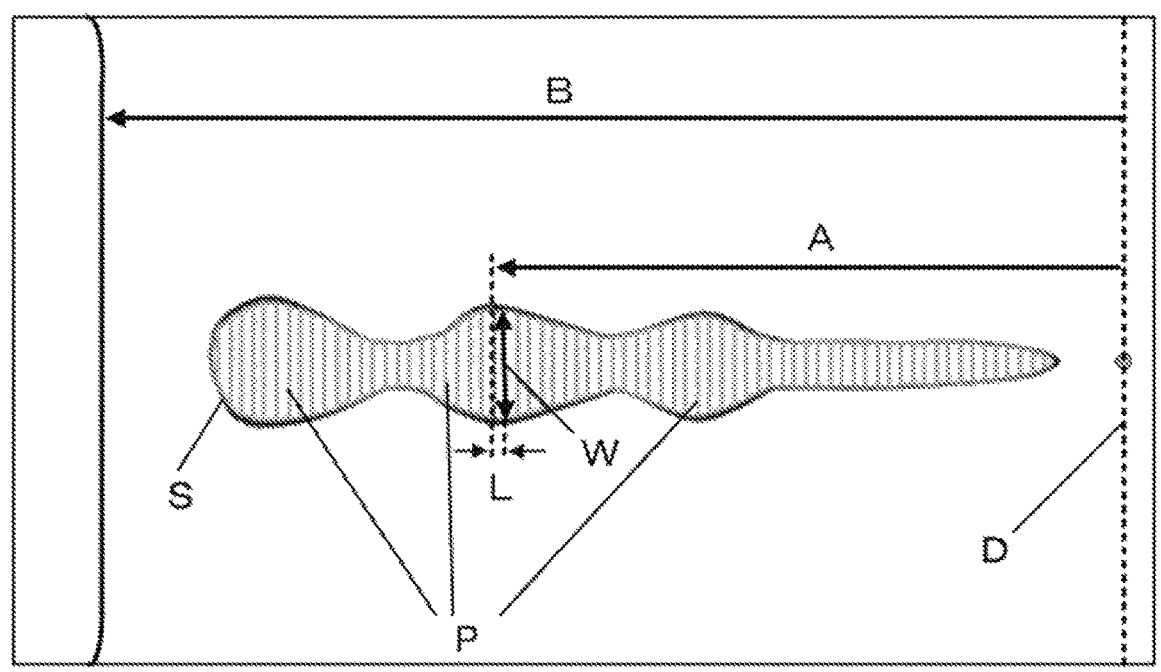

[Fig. 7]
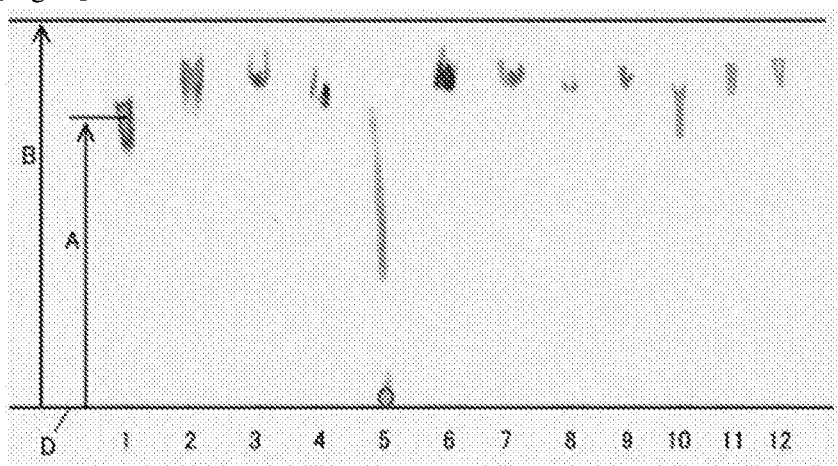

INK SET, INK STORED CONTAINER, INKJET PRINTING METHOD, AND INKJET PRINTING APPARATUS

TECHNICAL FIELD

The present disclosure relates to an ink set, an ink stored container, an inkjet printing method, and an inkjet printing apparatus.

BACKGROUND ART

Inkjet printing methods have simple printing processes, cost low, can produce multiple colors, can perform printing in an overlapping manner and obtain good print qualities because inkjet printing is contactless printing, and can perform high-speed printing without noise. Therefore, the inkjet printing methods are widely employed in home printers and commercial printers.

The inkjet printing methods perform printing by attaching low-viscosity inks on print media. Therefore, it is known that chromogenicity varies depending on fixing states of dyes included in the inks on print media.

When printing is performed using an ink set including a plurality of colors of inks including dyes as coloring materials, it is known that the coloring materials in the inks landing first on print media fix in surface layers of the print media, whereas that the coloring materials in the inks landing afterwards tend not to fix in the surface layers of the print media but fix in layers below the layers in which the coloring materials in the inks landing first have landed in the thickness direction of the print media.

Therefore, when bidirectional printing is performed using a plurality of colors of inks, there is a problem that the order in which the inks land on print media is different between the outward scanning printing and the homeward scanning printing to cause a color difference (bidirectional color difference) in the images formed.

Hence, there is provided an inkjet printing apparatus including a printing head provided with ink discharging ports symmetrically with respect to the main-scanning direction and configured to discharge inks in the outward scanning printing and in the homeward scanning printing in a manner that the inks land on print media in the same order to make it possible to obtain images having a small color difference due to bidirectional printing (see, e.g., PTL 1). There is also provided an inkjet printing head provided with discharging ports among which only discharging ports having a high ink discharging capacity are arranged symmetrically with respect to the main-scanning direction, to make it possible to obtain images having a small color difference due to bidirectional printing (see, e.g., PTL 2).

CITATION LIST

Patent Literature

PTL 1: Japanese Patent No. 4383778
PTL 2: Japanese Patent No. 5230084

SUMMARY OF INVENTION

Technical Problem

The present disclosure has an object to provide an ink set that, when used in bidirectional printing by an inkjet method, can suppress a color difference in the images to be obtained from outward scanning printing and homeward scanning printing.

Solution to Problem

According to one aspect of the present disclosure, provided is an ink set including inks each including a coloring material, an organic solvent, and water. A proportion of the organic solvent in each of the inks is 30 percent by mass or greater. A relative mobility difference (maximum relative mobility−minimum relative mobility) between a maximum relative mobility and a minimum relative mobility among relative mobilities of the coloring materials included in the inks is 0.1 or greater, where the relative mobilities are obtained by thin-layer chromatography in which the coloring materials are developed using the organic solvents included in the inks as developing solvents.

Advantageous Effects of Invention

The present disclosure can provide an ink set that, when used in bidirectional printing by an inkjet method, can suppress a color difference in the images to be obtained from outward scanning printing and homeward scanning printing.

BRIEF DESCRIPTION OF DRAWINGS

FIG. 1 is an exemplary diagram illustrating movement of an ink head and a conveyed state of a print medium in an inkjet printing apparatus according to an embodiment of the present disclosure.

FIG. 2 is an exemplary diagram illustrating an example of a method for performing printing on the same print region by an inkjet printing method according to an embodiment of the present disclosure.

FIG. 3 is a plan view illustrating an example of a main part of a serial-type image forming apparatus.

FIG. 4 is a side view illustrating an example of a main part of a liquid discharging unit of the apparatus of FIG. 3.

FIG. 5 is a front view illustrating an example of a main part of a liquid discharging unit of the apparatus of FIG. 3.

FIG. 6 is an exemplary diagram illustrating an example of developing a coloring material by thin-layer chromatography.

FIG. 7 is an image of a TLC plate on which coloring materials used in Examples and Comparative Examples were developed by thin-layer chromatography.

DESCRIPTION OF EMBODIMENTS (Ink Set)

An ink set of the present disclosure includes at least two inks each including a coloring material, an organic solvent, and water. A proportion of the organic solvent in each of the inks is 30 percent by mass or greater. A relative mobility difference (maximum relative mobility−minimum relative mobility) between a maximum relative mobility and a minimum relative mobility among relative mobilities of the coloring materials included in the inks is 0.1 or greater, where the relative mobilities are obtained by thin-layer chromatography in which the coloring materials are developed using the organic solvents included in the inks as developing solvents. The ink set includes other optional inks.

The ink set of the present disclosure is based on a finding that apparatuses are disadvantaged if a printing head has a complicated configuration and needs many nozzle lines or if an ink supplying system is complicated.

The present inventor has also found the following.

Hitherto, a focus has been put on bleeding to occur immediately after landing of inks. Hence, bleeding between colors has been suppressed by controlling mobilities of the coloring materials in a water/solvent mixed system and restricting fix positions of the coloring materials in the lateral direction. However, consideration has not been given on fix positions of the coloring materials in the thickness direction of print media after landing of inks. Therefore, chromogenicity has varied depending on the order of landing, to cause a color difference in the case of bidirectional printing.

The present inventor has found it possible to eliminate influence of the order in which inks land on print media against chromogenicity, by using an ink set that is a combination of at least two inks each including an organic solvent in a proportion of 30 percent by mass or greater, wherein a relative mobility difference (maximum relative mobility−minimum relative mobility) between a maximum relative mobility and a minimum relative mobility among relative mobilities of coloring materials included in the inks is 0.1 or greater, where the relative mobilities are obtained by thin-layer chromatography in which the coloring materials are developed using the organic solvents as developing solvents.

The ink set of the present disclosure can eliminate influence of the order in which inks land on print media. Therefore, when used in bidirectional printing by an inkjet method, the ink set can suppress a color difference in the images to be obtained from outward scanning printing and homeward scanning printing of the bidirectional printing.

After landing on print media, water in the inks evaporates rapidly whereas the organic solvents permeate the print media. As the organic solvents permeate the print media, the coloring materials also permeate the print media and move in the thickness direction of the print media. Relative mobility can be used as an indicator of an amount of movement of the coloring materials in the thickness direction of the print media. The amount of movement of the coloring materials in the thickness direction of the print media varies according to the relative mobility. With a greater relative mobility, the coloring materials permeate the print media to a greater degree and influence of the order in which the inks land on the print media against the fix positions of the coloring materials in the print media is offset. Hence, in bidirectional printing, adjustment of the relative mobility-based amount of movement of the coloring materials in the print media makes it possible to suppress a color difference in the images to be obtained from outward scanning printing and homeward scanning printing.

Outward scanning printing refers to main-scanning printing on the outbound path in reciprocating main-scanning printing (bidirectional printing). Homeward scanning printing refers to main-scanning printing on the inbound path in reciprocating main-scanning printing.

All of the terms "image formation", "recording", "print-typing", "imaging", "printing", "modeling", etc. used in the present disclosure are synonyms.

The inks used in the ink set of the present disclosure are not particularly limited and may be appropriately selected depending on the intended purpose. Examples of the inks include inks having process colors, such as black inks, cyan inks, magenta inks, and yellow inks.

When printing is performed using an ink set in which two or more of the inks are combined, multi-color images can be formed. When printing is performed using an ink set in which all process color inks are combined, full-color images can be formed.

Examples of inks having colors other than the process colors include red inks, green inks, blue inks, gray inks, light cyan inks, light magenta inks, and dark yellow inks. When the colors other than the process colors are used, it is possible to broaden the color gamut of full-color images and suppress graininess of images, and also possible to suppress the amounts to be applied, of inks having the process colors used for producing secondary colors. This makes print media less likely to cause absorption failure. This makes it possible to suppress beading, bleeding, hue deflection, and hue change during drying.

<Relative Mobility Difference (Maximum Relative Mobility−Minimum Relative Mobility)>

A relative mobility difference (maximum relative mobility−minimum relative mobility) between a maximum relative mobility and a minimum relative mobility among relative mobilities of the coloring materials included in the inks is 0.1 or greater and preferably 0.5 or greater, where the relative mobilities are obtained by thin-layer chromatography in which the coloring materials are developed using the organic solvents as developing solvents. When the relative mobility difference (maximum relative mobility−minimum relative mobility) is 0.1 or greater, bidirectional printing can suppress a color difference in the images to be obtained from outward scanning printing and homeward scanning printing.

The maximum relative mobility refers to a relative mobility that is the highest among the relative mobilities of the coloring materials included in the inks of the ink set. The minimum relative mobility refers to a relative mobility that is the lowest among the relative mobilities of the coloring materials included in the inks of the ink set.

Specifically, relative mobility (hereinafter may also be referred to as "Rf value") of a coloring material can be calculated according to the procedures (1) to (4) below by thin-layer chromatography.

(1) A thin-layer chromatography (TLC) plate for development is used. As a developing solvent, the same organic solvent as the organic solvent used in the ink is used. When a plurality of organic solvents are included in the ink, the developing solvent includes the plurality of organic solvents at the same ratio by mass as the ratio by mass of the plurality of organic solvents in the ink.

(2) An evaluation sample liquid (0.5 microliters) obtained by diluting a measuring target coloring material with pure water to a concentration of 0.5 percent by mass is applied on the TLC plate.

(3) After the applied evaluation sample liquid is dried sufficiently, the TLC plate is adapted to stream of a development layer containing the developing solvent and then immersed in the developing solvent for development for 15 hours.

(4) After the development, the TLC plate is dried sufficiently, and the developed TLC plate is scanned with a scanner for imaging. The obtained image is analyzed with image analyzing software to calculate the Rf value of the coloring material.

As the thin-layer chromatography (TLC) plate for development, a product named UNMODIFIED SILICA GEL TLC PLATE (available from Merck & Co., Inc., with an average layer thickness of 200 micrometers, a plastic sheet) can be used. As the image analyzing software, software named IMAGE J can be used.

Calculation of the Rf value of the coloring material will be described with reference to FIG. 6. FIG. 6 is an exemplary diagram illustrating an example of developing a coloring material by thin-layer chromatography.

Typically, the Rf value of a coloring material is a value defined as (distance (A) from a starting line (D) to the center of a spot of a component)/(distance (B) from the starting line (D) to the leading end of the developing solvent). However, when a dye is used as a coloring material, the dye may not be of a single component. In addition, the developing solvent may cause tailing because the developing solvent is the organic solvent used in the ink. Hence, the Rf value of the coloring material may be the average of Rf values of respective spots (P) each calculated according to the formula (1) below.

$$Rf \text{ value of the coloring material at each spot } (P) = \\ [\{(\text{spot width } (W)) \times (\text{unit length } (L))/(\text{area } (S) \text{ of a whole spot})\} \times (\text{distance } (A) \text{ from the start line } (D))]/(\text{distance } (B) \text{ from the start line } (D) \text{ to the leading end of the developing solvent}) \quad \text{Formula (1)}$$

The unit length (L) in the formula (1) is an image resolving interval used in analyzing a thin-layer chromatography image. When the image is digitalized, pixel interval in the image is used as the unit length, and pixels can be calculated as unit length. The unit length in a 400 dpi image is 63.5 micrometers.

<Relative Mobility Difference Between Cyan Dye, Magenta Dye, and Yellow Dye>

When the inks include a cyan ink including a cyan dye, a magenta ink including a magenta dye, and a yellow ink including a yellow dye, a difference between any two of a relative mobility of the cyan dye, a relative mobility of the magenta dye, and a relative mobility of the yellow dye is preferably 0.1 or greater, where the relative mobilities are obtained by thin-layer chromatography in which the dyes are developed using the organic solvents as developing solvents. When the difference between the relative mobilities is 0.1 or greater, a color difference in the images to be obtained can be suppressed even in high-speed printing.

The Rf value is defined based on the relationship between the coloring material and the developing solvent (which is the same kind of an organic solvent as the solvent included in the ink, or an organic solvent obtained by mixing a plurality of organic solvents at the same ratio by mass as in the ink when a plurality of organic solvents are included in the ink). Dyes used in water-based dye inks are water-soluble and hence have a strong tendency toward hydrophilicity. Hence, there is a tendency that a developing solvent having a higher hydrophilicity gives a higher Rf value and that a developing solvent having a higher hydrophobicity gives a lower Rf value. As a dye-side factor, solubility of dyes varies depending on the amount of hydrophilic groups such as sulfonic acid group and carboxylic acid group incorporated, molecular weight, and dye skeleton. When a dye is more likely to form clusters due to the skeleton of the dye, there is a tendency that the dye has a lower solubility to the organic solvent and has a lower Rf value.

In order to control the Rf value of the coloring material in the ink, there is a need for examining the solubility between the coloring material and organic solvent used. An organic solvent having a high power of dissolving a coloring material has a high affinity and can give a high Rf value. In contrast, an organic solvent having a low power of dissolving a coloring material has a low affinity and can give a low Rf value. The Rf value can be controlled to an intended value by examining dissolving powers of a plurality of organic solvents and combining solvents having different dissolving powers. There is a tendency that a dye having a low molecular weight, a dye less likely to form clusters, etc. have a small apparent molecular weight when dissolved in an organic solvent formulation, leading to a high Rf value. Utilizing this characteristic, it is possible to control the Rf value.

The ink set of the present disclosure can be obtained by combining two or more of the inks.

<Ink>

The organic solvent, water, coloring material, resin and additives for use in the ink are described next.

<Organic solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent is 30 percent by mass or greater, preferably 30 percent by mass or greater but 60 percent by mass or less, and more preferably 40 percent by mass or greater but 60 percent by mass or less of the total amount of the ink. When the proportion of the organic solvent is 30 percent by mass or greater, the coloring material can maintain mobility even if the coloring material is in a concentrated state during a drying process after the ink lands on a print medium. Therefore, the dye can obtain a time to move in the thickness direction of the print medium. This can suppress a color difference in the images to be obtained.

<Water>

The proportion of water in the ink has no particular limit and can be suitably selected to suit to a particular application. In terms of the drying property and discharging reliability of the ink, the proportion is preferably from 10 through 90 percent by mass and more preferably from 20 through 60 percent by mass.

The water is not particularly limited and may be appropriately selected depending on the intended purpose. Examples of the water include: pure water such as ionexchanged water, ultrafiltrated water, reverse osmotic water, and distilled water; and ultrapure water. One of these kinds of water may be used alone or two or more of these kinds of water may be used in combination.

<Coloring Material>

The coloring materials included in the inks are not particularly limited and may be appropriately selected depending on the intended purpose so long as a relative mobility difference (maximum relative mobility−minimum relative mobility) between a maximum relative mobility and a minimum relative mobility among relative mobilities of the coloring materials is 0.1 or greater, where the relative mobilities are obtained by thin-layer chromatography in which the coloring materials are developed using the organic solvents included in the inks as developing solvents.

Examples of the coloring materials include dyes.

The dyes are not particularly limited and may be appropriately selected depending on the intended purpose. Water-soluble dyes are preferable. When the water-soluble dyes are used, it is possible to obtain clear hues and obtain images that maintain glossiness of print media.

As the dyes, dyes that obtain different Rf values in thin-layer chromatography in which the organic solvents included in the inks are used are selected and combined to form an ink set. Hence, the dyes have different permeability properties in the thickness direction of print media. This can suppress bidirectional color difference.

<<Dye>>

When dyes used can provide obtained images with a high weatherability even when used in inks having cyan, magenta, yellow, and black colors, which are the process colors, durabilities of the obtained images can be enhanced. Examples of dyes that can provide such a high weatherability include dyes described in the documents indicated below.

Cyan dyes: Japanese Unexamined Patent Application Publication No. 2007-224274 in paragraphs [0189] to [0231] and Japanese Unexamined Patent Application Publication No. 2009-062515 in paragraphs [0025] to [0062]

Magenta dyes: Japanese Unexamined Patent Application Publication No. 2009-062515 in paragraphs [0152] to [0182], Japanese Unexamined Patent Application Publication No. 2003-192930, Japanese Unexamined Patent Application Publication No. 2005-008868, Japanese Patent No. 5419705, and Japanese Patent No. 4989975

Yellow dyes: Japanese Unexamined Patent Application Publication No. 2007-224274 in paragraphs [0016] to [0118] and Japanese Unexamined Patent Application Publication No. 2009-062515 in paragraphs [0063] to [0130]

Black dyes: Japanese Unexamined Patent Application Publication No. 2007-224274 in paragraphs [0132] to [0189] and Japanese Unexamined Patent Application Publication No. 2009-062515 in paragraphs [0189] to [0259]

Specific examples of the cyan dyes include a compound (C-I) presented below (Rf value: 0.92), a compound (C-II) presented below (Rf value: 0.34), C.I. Direct Blue 199 (Rf value: 0.93), FUJIFILM PRO-JET CYAN OF 1 LIQ. (Rf value: 0.91), Blue No. 1 (Rf value: 0.97), and BAYSCRIPT CYAN GA LIQ. (Rf value: 0.92). Among these cyan dyes, the compound (C-I), the compound (C-II), and FUJIFILM PRO-JET CYAN OF 1 LIQ. are preferable.

Compound (C-I)

[Chem. 1]

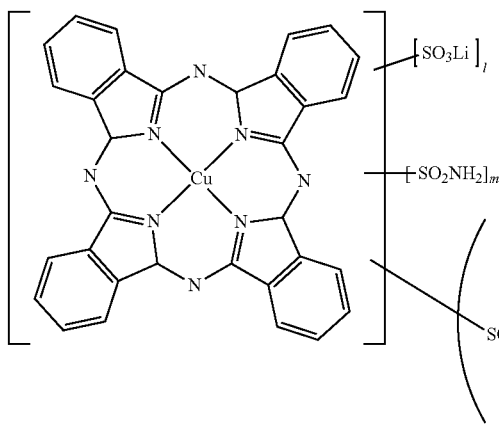
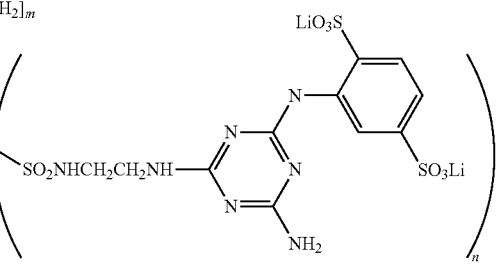

In the compound (C-I), "l" is 0.3, "m" is 2.3, and "n" is 1.4.

Compound (C-II)

[Chem. 2]

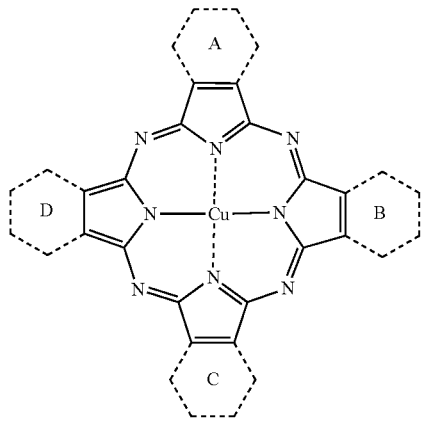

Two of A to D are the following:

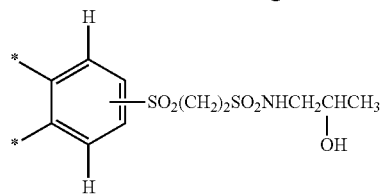

Remaining two are the following:

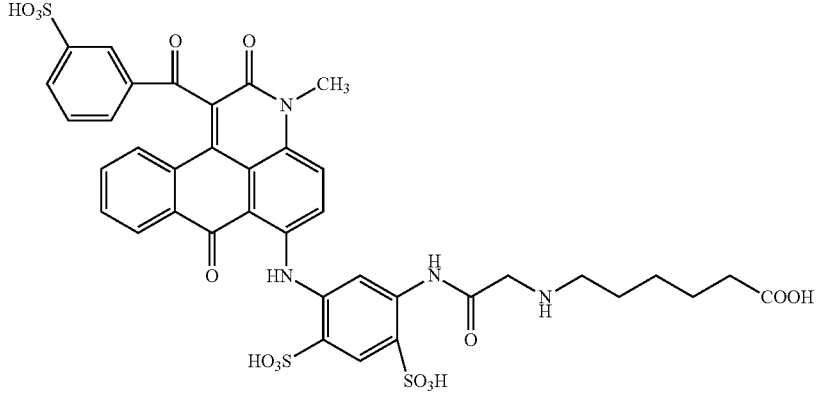

The sign * represents a position at which a phthalocyanine ring is bonded.

Specific examples of the magenta dyes include a compound (M-I) presented below (Rf value: 0.93), a compound (M-II) presented below (Rf value: 0.96), C.I. Acid Red 52 (Rf value: 0.95), FUJIFILM PRO-JET MAGENTA 1 LIQ. (Rf value: 0.95), and C.I. Acid Red 254 (Rf value: 0.95). Among these magenta dyes, the compound (M-I), the compound (M-II), and C.I. Acid Red 52 are preferable.

Compound (M-I)

[Chem. 3]

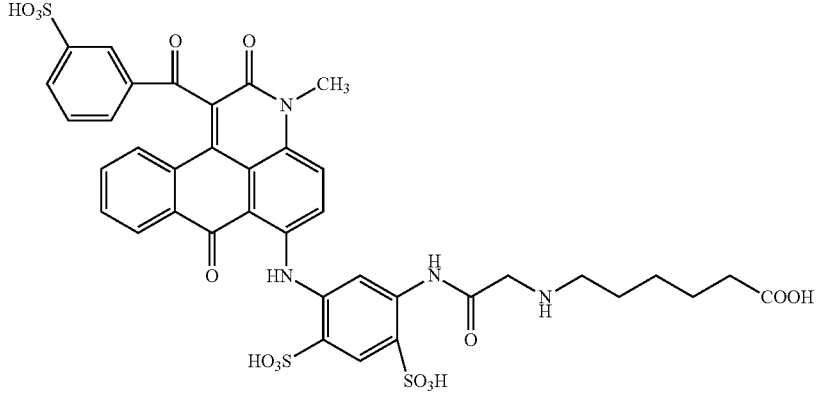

Compound (M-II)

[Chem. 4]

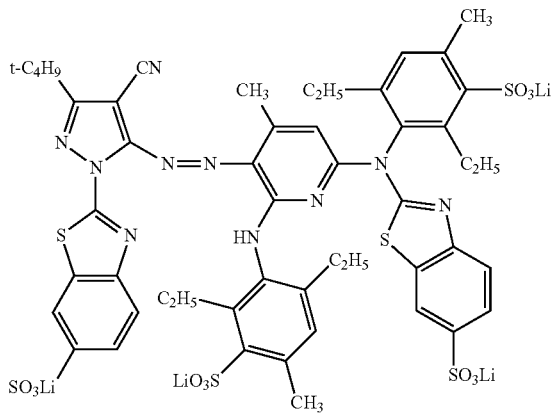

Specific examples of the yellow dyes include a compound (Y-I) presented below (Rf value: 0.85), a compound (Y-II) presented below (Rf value: 0.95), C.I. Direct Yellow 132 (Rf value: 0.94), C.I. Direct Yellow 142 (Rf value: 0.95), 1,3-naphthalene disulfonic acid (Rf value: 0.96), and Food Yellow No. 4 (Rf value: 0.95). Among these yellow dyes, the compound (Y-I), C.I. Direct Yellow 132, and C.I. Direct Yellow 142 are preferable.

Compound (Y-I)

[Chem. 5]

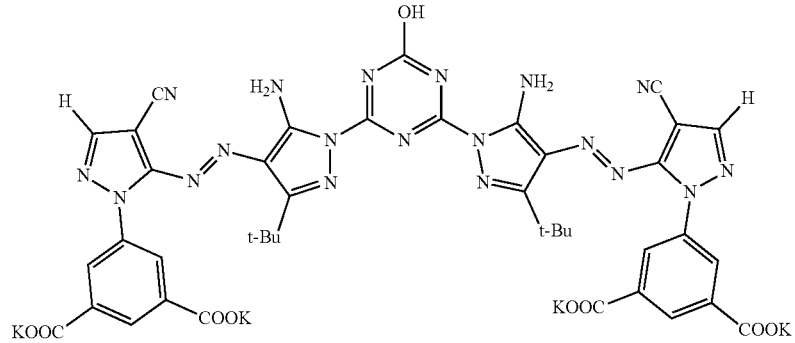

In the compound (Y-I), "t-Bu" represents a tert-butyl group.

Compound (Y-II)

[Chem. 6]

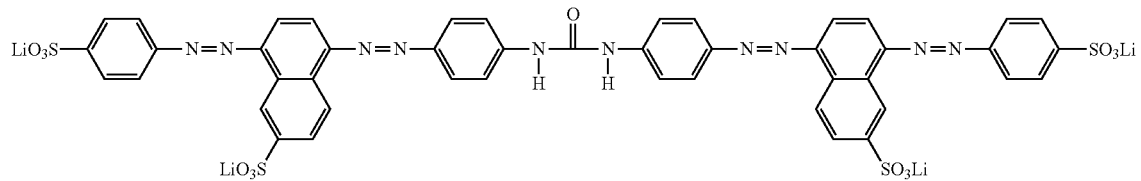

Specific examples of the black dyes include a compound (K-I) presented below (Rf value: 0.83), C.I. Direct Black 168, Li salt (Rf value: 0.91), FUJIFILM PRO-JET FAST BLACK 2 CF1 LIQ. (Rf value: 0.92), and LANXESS BAYSCRIPT BLACK SP LIQ. (Rf value: 0.89). Among these black dyes, the compound (K-I), C.I. Direct Black 168, Li salt, and FUJIFILM PRO-JET FAST BLACK 2 CF1 LIQ. are preferable.

Compound (K-I)

[Chem. 7]

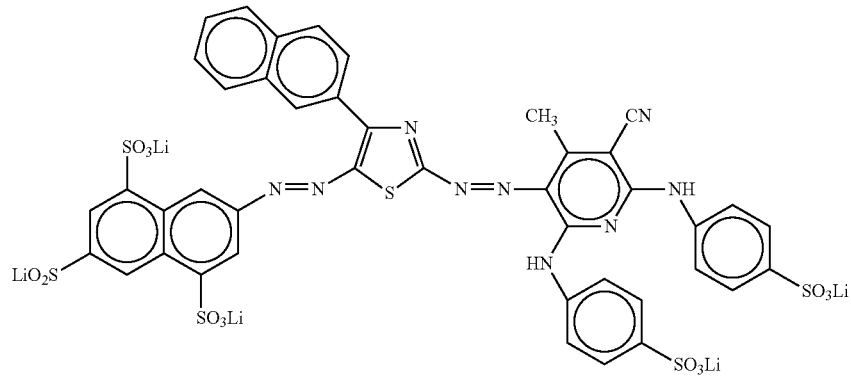

The Rf values in the specific examples of the cyan dyes, the specific examples of the magenta dyes, the specific examples of the yellow dyes, and the specific examples of the black dyes are the values obtained by thin-layer chromatography in which the dyes are developed for 15 hours using an organic solvent obtained by mixing glycerin, 1,3-propanediol, and 2-pyrrolidone at a mixing ratio by mass of 10:30:1 as a developing solvent.

As dyes to be used in inks for intermediate hues, one of commercially available dyes having hues of from yellow to orange and to red may be used alone or two or more of such commercially available dyes may be used in combination.

Examples of the commercially available dyes having hues of from yellow to orange and to red include: C.I. Direct Orange 6, 8, 10, 26, 29, 39, 41, 49, 51, 62, and 102; C.I. Acid Orange 7, 8, 10, 33, 56, and 64; and C.I. Food Yellow 3, 4, and 5. Among these commercially available dyes, C.I. Acid Orange 33 and C.I. Food Yellow 5 are preferable in terms of hue and chromogenicity.

The ink may include other dyes than the dyes presented above, such as acid dyes, food dyes, direct dyes, basic dyes, and reactive dyes as complementary colors. One of these dyes may be used alone or two or more of these dyes may be used in combination.

Examples of the acid dyes and the food dyes include:
C.I. Acid Yellow 17, 23, 42, 44, 79, and 142;
C.I. Acid Red 1, 8, 13, 14, 18, 26, 27, 35, 37, 42, 52, 82, 87, 89, 92, 97, 106, 111, 114, 115, 134, 186, 249, 254, and 289;
C.I. Acid Blue 9, 29, 45, 92, and 249;
C.I. Acid Black 1, 2, 7, 24, 26, and 94;
C.I. Food Yellow 3 and 4;
C.I. Food Red 7, 9, and 14; and
C.I. Food Black 1 and 2.

One of these acid dyes and food dyes may be used alone or two or more of these acid dyes and food dyes may be used in combination.

Examples of the direct dyes include:
C.I. Direct Yellow 1, 12, 24, 26, 33, 44, 50, 120, 132, 142, 144, and 86;
C.I. Direct Red 1, 4, 9, 13, 17, 20, 28, 31, 39, 80, 81, 83, 89, 225, and 227;
C.I. Direct Blue 1, 2, 6, 15, 22, 25, 71, 76, 79, 86, 87, 90, 98, 163, 165, 199, and 202; and
C.I. Direct Black 19, 22, 32, 38, 51, 56, 71, 74, 75, 77, 154, 168, and 171.

One of these direct dyes may be used alone or two or more of these direct dyes may be used in combination.

Examples of the basic dyes include:
C.I. Basic Yellow 1, 2, 11, 13, 14, 15, 19, 21, 23, 24, 25, 28, 29, 32, 36, 40, 41, 45, 49, 51, 53, 63, 465, 67, 70, 73, 77, 87, and 91;
C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112;
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and
C.I. Basic Black 2 and 8.

One of these basic dyes may be used alone or two or more of these basic dyes may be used in combination.

Examples of the reactive dyes include:
C.I. Reactive Black 3, 4, 7, 11, 12, and 17;
C.I. Reactive Yellow 1, 5, 11, 13, 14, 20, 21, 22, 25, 40, 47, 51, 55, 65, and 67;
C.I. Reactive Red 1, 14, 17, 25, 26, 32, 37, 44, 46, 55, 60, 66, 74, 79, 96, and 97; and
C.I. Reactive Blue 1, 2, 7, 14, 15, 23, 32, 35, 38, 41, 63, 80, and 95.

One of these reactive dyes may be used alone or two or more of these reactive dyes may be used in combination.

The proportion of the dye is preferably 2 percent by mass or greater but 6 percent by mass or less of the total amount of the ink.

The proportion of the coloring material in ink is preferably from 0.1 through 15 percent by mass and more preferably from 1 through 10 percent by mass in terms of enhancement of image density, fixability, and discharging stability.

<Resin>

The type of the resin contained in the ink has no particular limit and can be suitably selected to suit to a particular application. Specific examples thereof include, but are not limited to, urethane resins, polyester resins, acrylic-based resins, vinyl acetatebased resins, styrene-based resins, butadiene-based resins, styrene-butadiene-based resins, vinyl-chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. It is possible to synthesize the resin particle or obtain from market. These can be used alone or in combination of the resin particles.

<Additives>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of silicone-based surfactatns, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-based surfactant has no particular limit and can be suitably selected to suit to a particular application. Examples thereof include a compound in which the polyalkylene oxide structure represented by the following general formula S-1 is introduced into the side chain of the Si site of dimethyl poly siloxane.

General formula S-1

[Chem. 8]

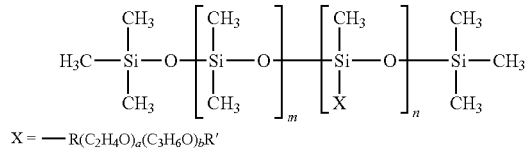

$X = $ ——$R(C_2H_4O)_a(C_3H_6O)_bR'$

In the general formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

The number of carbon atoms replaced with fluorine atoms in the fluorosurfactants is preferably 2 or greater but 16 or less and more preferably 4 or greater but 16 or less.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these fluorosurfactants, polyoxyalkylene ether polymer compounds having a perfluoroalkyl ether group in its side chain are preferable because these compounds do not foam easily and the fluorosurfactant represented by the following general formula F-1 or general formula F-2 is more preferable.

[Chem. 9]

General formula F-1

In general formula F-1, "m" is preferably an integer of 0 or greater but 10 or less and "n" is preferably an integer of 0 or greater but 40 or less in order to provide water solubility.

General formula F-2

In general formula F-2, Y represents H, $C_nF_{2n+1}$, where "n" is an integer of 1 or greater but 6 or less, $CH_2CH(OH)CH_2$—$C_nF_{2n+1}$, where n represents an integer of 4 or greater but 6 or less, or $C_pH_{2p+1}$, where p represents an integer of 1 or greater but 19 or less. "a" represents an integer of 4 or greater but 14 or less.

Products available on the market may be used as the fluorosurfactant.

Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC129, FC-135, FC-170C, FC-430, and FC-431 (all manufactured by SUMITOMO 3M JAPAN); MEGAFAC F-470, F-1405, and F-474 (all manufactured by DIC CORPORATION); ZONYL (Trade Mark) TBS, FSP, FSA, FSN-100, FSN, FSO-100, FSO, FS-300, and UR (all manufactured by Du Pont Kabushiki Kaisha); FT-110, FT-250, FT-251, FT-4005, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these products, FS-300 (manufactured by Du Pont Kabushiki Kaisha), FT-110, FT-250, FT-251, FT-4005, FT-150, and FT-400SW (all manufactured by NEOS COMPANY LIMITED), POLYFOX PF-151N (manufactured by OMNOVA SOLUTIONS INC.), and UNIDYNE DSN-403N (manufactured by DAIKIN INDUSTRIES) are preferable in terms of good printing quality, coloring in particular, and improvement on permeation, wettability, and uniform dyeing property to paper.

The proportion of the surfactant in ink is not particularly limited and can be suitably selected to suit to a particular application. It is preferably from 0.001 through 5 percent by mass and more preferably from 0.05 through 5 percent by mass in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
−25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 through 12 and more preferably from 8 through 11 in terms of prevention of corrosion of metal materials contacting the ink.

It is preferable to use the ink set of the present disclosure in bidirectional printing by an inkjet method.

<Print Medium>

The print medium for use in printing is not particularly limited. Specific examples thereof include, but are not limited to, plain paper, gloss paper, special paper, cloth, film, OHP sheets, printing paper for general purpose.

A print medium, which is to be the target of the inkjet printing method of the present disclosure, includes a support and at least one ink receiving layer on the support, and further includes other optional layers.

A preferable print medium is an inkjet print medium that includes a support, a lower layer provided on the support and including silica, a polyvinyl alcohol, and a crosslinking agent, and an upper layer including alumina or colloidal silica and a polyvinyl alcohol and substantially free of a crosslinking agent for the polyvinyl alcohol.

The upper layer of this print medium is the print surface of the print medium. Bekk smoothness of this surface is preferably 300 seconds or longer. When the Bekk smoothness of this surface is 300 seconds or longer, it is likely that pixel uniformity and circularity are obtained, to make noise less likely to occur in photo tone.

It is preferable that the ink receiving layer have a multi-layer structure including 2 or more layers and that a lower layer in the multi-layer structure include porous particles having a large specific surface area and formed of, for example, an inorganic oxide in order to be capable of absorbing inks rapidly and fixing colorants. Specific examples of the porous particles include silica and alumina. Of silica, synthetic silica obtained by a gas phase method and having an average primary particle diameter of 30 nm or less and a BET specific surface area of 250 $m^2/g$ or greater is particularly preferable because of a high ink absorbability and a high glossiness.

Examples of the alumina include beta-alumina and gamma-alumina.

It is preferable that an upper layer, which is the surface of the print medium, include, as the porous particles, colloidal silica or alumina having a small primary particle diameter and a large secondary particle diameter. Colloidal silica particles treated with an aluminum salt is particularly preferable.

A hydrophilic binder having a high transparency and capable of making ink solvent permeability higher is preferable as a binder in the ink receiving layer. What matters in using a hydrophilic binder is that the hydrophilic binder does not swell and clog the voids during an earlier period of ink solvent permeation. Hydrophilic binders that tend not to swell at around room temperature are preferable. Particularly preferable hydrophilic binders are completely or partially saponified polyvinyl alcohols and cationmodified polyvinyl alcohols. An ink receiving layer having a high voidage and a high liquid absorbability can be formed by adding a crosslinking agent such as borax to a polyvinyl alcohol in the lower layer to form the lower layer into a gel-state structure and drying the lower layer as is in the gel-state structure.

As the base of the print medium, any of known paper, synthetic paper, resin-coated paper, film, etc. may be used. However, a non-ink-absorbable base is preferable. Resin coated paper used for photographic paper is particularly preferable as a medium base for reproducing photo image qualities.

<Printed Matter>

The printed matter of the present disclosure includes a print medium and an image formed on the print medium with the ink of the present disclosure.

An inkjet printing device and an inkjet printing method are used to print the image on the print medium to obtain the printed matter.

<Ink Stored Container>

The ink stored container of the present disclosure includes any one of the inks used in the ink set of the present disclosure and a container storing the ink, and further includes other members appropriately selected as needed.

The container is not particularly limited and may be of any shape, any structure, any size, any material, etc. that may be appropriately selected depending on the intended purpose. Preferable examples of the container include a container including at least an ink bag formed of, for example, aluminum laminate film or resin film.

<Inkjet Printing Apparatus and Inkjet Printing Method>

It is preferable that the inkjet printing method of the present disclosure include a heating/drying step of heating and drying, as needed, a print medium on which an image is formed with inks discharged in an ink discharging step.

It is preferable that the inkjet printing apparatus of the present disclosure include a heating/drying unit configured to heat and dry, as needed, a print medium on which an image is formed with inks discharged by an ink discharging unit, and that the inkjet printing apparatus of the present disclosure include: a printing head including a plurality of printing sections configured to print the inks used in the ink set of the present disclosure all over an entire range, in one direction, of an image formation region; and a main-scanning driving section configured to drive at least one of the printing head and the print medium and perform main scanning.

The inkjet printing method of the present disclosure can be performed preferably by the inkjet printing apparatus of the present disclosure. The ink discharging step can be performed preferably by the ink discharging unit. The heating step can be performed preferably by the heating unit. Other steps can be performed preferably by other units.

It is preferable that the inkjet printing method of the present disclosure perform bidirectional printing by an inkjet printing manner.

—Ink Discharging Step and Ink Discharging Unit—

The ink discharging step is a step of applying a stimulus (energy) to the inks used in the ink set of the present disclosure to discharge the inks from various types of ink discharging nozzles to print an image on a print medium.

The ink discharging unit is a unit configured to apply a stimulus (energy) to the inks used in the ink set of the present disclosure to discharge the inks from various types of ink discharging nozzles and discharge the inks onto a print medium.

The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of a method for discharging the inks used in the ink set include a so-called piezo method (see Japanese Examined Patent Publication No. 02-51734) using a piezoelectric element as a pressure generating unit to pressurize the inks in an ink flow path to deform a vibration plate constituting a wall surface of the ink flow path and change the internal capacity of the ink flow path to discharge ink droplets, a so-called thermal method (see Japanese Examined Patent Publication No. 61-59911) using a heating resistor to heat the inks in an ink flow path and generate bubbles, and an electrostatic method (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

A size of the liquid droplets of the inks to be discharged is preferably 3 pL or greater but 40 pL or less. A discharging/jetting speed of the liquid droplets of the inks is preferably 5 m/s or higher but 20 m/s or lower. A driving frequency for discharging the liquid droplets of the inks is preferably 1 kHz or higher. A resolution of the liquid droplets of the inks is preferably 300 dpi or higher.

A printing speed is preferably 8.0 cm$^2$/sec or higher, more preferably 16 cm$^2$/sec or higher, and particularly preferably 33 cm$^2$/sec or higher.

—Heating Step and Heating Unit—

The heating step is a step of heating the print medium on which an image is printed. The heating unit is a unit configured to heat the print medium on which an image is printed.

The inkjet printing method and the inkjet printing apparatus can apply high image-quality printing on the print medium. In order to be capable of forming images with higher image qualities, a higher scratch resistance, and a higher close adhesiveness and to be capable of accommodating to high-speed printing conditions, it is preferable that the inkjet printing method and the inkjet printing apparatus heat the print medium after printing. Through the heating step after printing, filming of the resin included in the inks is promoted. This can improve image hardness of the printed matter.

Many known devices may be used as the device used in the heating step. Examples of the device include devices for, for example, forced-air heating, radiation heating, conduction heating, high-frequency drying, and microwave drying. One of these devices may be used alone or two or more of these devices may be used in combination.

A temperature for the heating may be varied depending on the kind and amount of the organic solvent included in the inks and a minimum filming temperature of the resin emulsion added, and may also be varied depending on the kind of the base on which printing is performed.

The temperature for the heating is preferably high, more preferably 20 degrees C. or higher but 120 degrees C. or lower, yet more preferably 40 degrees C. or higher but 100 degrees C. or lower, and particularly preferably 50 degrees C. or higher but 90 degrees C. or lower in terms of driability and a filming temperature. When the temperature for the heating is 40 degrees C. or higher but 120 degrees C. or lower, it is possible to prevent the printing target print medium from being damaged by heat and to suppress no discharging due to warming of an ink head.

The inks used in the ink set of the present disclosure are not limited to use in inkjet printing methods but can be used in a wide variety of methods. Examples of such methods other than inkjet printing methods include blade coating methods, gravure coating methods, gravure offset coating methods, bar coating methods, roll coating methods, knife coating methods, air knife coating methods, comma coating methods, U comma coating methods, AKKU coating methods, smoothing coating methods, micro gravure coating methods, reverse roll coating methods, 4- or 5-roll coating methods, dip coating methods, curtain coating methods, slide coating methods, die coating methods, and spray coating methods.

A method for performing image formation for the same region of an image on a print medium will be described with reference to the drawings.

FIG. 1 is an exemplary diagram illustrating movement of ink heads and a conveyed state of a print medium in the inkjet printing apparatus according to an embodiment of the present disclosure. FIG. 1 indicates a main-scanning direction. Printing is performed by moving the print medium on a platen 4 by means of a registration roller (conveying unit) 1 and moving a carriage 7 carrying ink heads 6 in the main-scanning direction. FIG. 2 is an exemplary diagram illustrating an example of a method for performing printing on the same print region by the inkjet printing method according to an embodiment of the present disclosure. A term "pass" refers to printing performed by the ink heads while scanning in the main-scanning direction. A term "1-pass printing" refers to printing performed by 1 time of scanning. A term "multi-pass printing" refers to printing performed by a plurality of times of scanning A term "n-pass printing" refers to printing performed on the same region n times by n times of scanning to complete an image. A term "band" refers to a print width printed by 1 pass. In FIG. 2, circled numbers on the print medium represent how many times images have been overlaid on the positions of the circled numbers. For example, a circled 2 indicates a region on which printing has been performed twice in an overlapping manner (2 times of printing on the same region).

In FIG. 2, the multi-pass number for printing on a paper sheet by an ink head 21 is set to 4, and the printing range of the ink head 21 is divided into bands 21-1 through 21-4 correspondingly to the multi-pass number of 4. Printing is started from the band 21-1 at the upstream end of the ink head 21. After printing from that band (1st pass) is performed, the print medium is conveyed by a width corresponding to 1 band and the next printing (2nd pass) is performed. This process is repeated sequentially. Bidirectional printing refers to printing performed bidirectionally, i.e., printing performed in a reciprocating step.

With the ink set of the present disclosure, it is possible to satisfy both of high-speed printing and suppression of color difference that may occur due to changes in the order in which the inks of the ink set are printed. According to methods that hitherto have been explored for eliminating color difference in bidirectional printing, main-scanning printing is performed for the same region of an image a plurality of times, i.e., the image is printed divisionally over a plurality of times corresponding to the number of times to perform main scanning, such that the order of printing is dispersed on a timeseries basis and color difference is eliminated. In this case, however, it has been impossible to offset bidirectional color difference sufficiently unless the divisor is a large number. As compared with this, according to the present disclosure, a great effect can be obtained when printing is performed for the same region of an image by 4 or less times of main scanning (4 or less passes), and a remarkable effect can be obtained when printing is performed for the same region of an image by 2 or less times of main scanning (2 or less passes).

Note that reciprocating main-scanning printing (bidirectional printing) refers to a total of 2 times of printing (2 passes), including 1 time of outward scanning printing (1 pass) and 1 time of homeward scanning printing (1 pass).

An inkjet printing apparatus capable of performing printing using the inks will be described with reference to the drawings. Inkjet printing apparatuses include serial-types (shuttle-types) in which a carriage is used for scanning and line-types including a line-type head. FIG. 3 is a plan view illustrating an example of a main part of a serial-type image forming apparatus. FIG. 4 is a side view illustrating an example of a main part of a liquid discharging unit of the apparatus of FIG. 3. FIG. 5 is a front view illustrating an example of a main part of a liquid discharging unit of the apparatus of FIG. 3.

As illustrated in FIG. 3, the inkjet printing apparatus is a serial-type apparatus in which a carriage 403 moves in a reciprocating manner in the main-scanning direction by means of a main-scanning moving mechanism 493. The main-scanning moving mechanism 493 includes a guide member 401, a main-scanning motor 405, a timing belt 408, and other members. The guide member 401 is passed over between left and right side panels 491A and 491B and supports the carriage 403 in a manner that the carriage 403 can move. Via the timing belt 408 passed over between a drive pulley 406 and a driven pulley 407, the main-scanning motor 405 drives the carriage 403 to move in a reciprocating manner in the main-scanning direction.

The carriage 403 is mounted with a liquid discharging unit 440 of the present disclosure. The liquid discharging unit 440 is an integrated body of a liquid discharging head 404 and a head tank 441. The liquid discharging head 404 of the liquid discharging unit 440 is configured to discharge liquids having, for example, yellow (Y), cyan (C), magenta (M), and black (K) colors. The liquid discharging head 404 is mounted in a state that a nozzle line including a plurality of nozzles is provided in a sub-scanning direction orthogonal to the main-scanning direction and a discharging direction is downward.

The liquid discharging unit is formed of a housing portion including the side panels 491A and 491B and a back panel 491C, the main-scanning moving mechanism 493, the carriage 403, and the liquid discharging head 404, which are among the members constituting a liquid discharging mechanism.

At least one of a maintenance/recovery mechanism 420 and a supplying mechanism 494 may be additionally attached on, for example, the side panel 491B of the liquid discharging unit described above to constitute another liquid discharging unit.

By means of the supplying mechanism 494 configured to supply the liquid discharging head 404 with liquids stored outside the liquid discharging head 404, the liquids stored in liquid cartridges 450 are supplied into the head tank 441.

The supplying mechanism 494 includes a cartridge holder 451, which is a loading section to be loaded with the liquid cartridges 450, a tube 456, a liquid sending unit 452 including a liquid sending pump, and others. The liquid cartridges 450 are attached in the cartridge holder 451 in an attachable/detachable manner. The liquids are sent to the head tank 441 from the liquid cartridges 450 by the liquid sending unit 452 through the tube 456.

The inkjet printing apparatus includes a conveying mechanism 495 configured to convey a paper sheet 410. The conveying mechanism 495 includes a conveying belt 412, which is a conveying unit, and a sub-scanning motor 416 configured to drive the conveying belt 412.

The conveying belt 412 attracts a paper sheet 410 and conveys the paper sheet 410 at a position counter to the liquid discharging head 404. The conveying belt 412 is an endless belt and is passed over between a conveying roller 413 and a tension roller 414. The paper sheet 410 can be attracted by, for example, electrostatic attraction and air suctioning.

The conveying belt 412 moves in the sub-scanning direction in a rotating manner by the conveying roller 413 being driven to rotate by the sub-scanning motor 416 via a timing belt 417 and a timing pulley 418.

The maintenance/recovery mechanism 420 configured to maintain or recover the liquid discharging head 404 is disposed on a side of the conveying belt 412 on one side in the main-scanning direction of the carriage 403.

The maintenance/recovery mechanism 420 includes a capping member 421 configured to cap a nozzle surface (a surface in which nozzles are formed) of the liquid discharging head 404, a wiper member 422 configured to wipe the nozzle surface, and others.

The main-scanning moving mechanism 493, the supplying mechanism 494, the maintenance/recovery mechanism 420, and the conveying mechanism 495 are attached on the housing including the side panels 491A and 491B and the back panel 491C.

In the inkjet printing apparatus having this configuration, a paper sheet 410 is fed onto and attracted to the conveying belt 412 and conveyed in the sub-scanning direction by rotational moving of the conveying belt 412.

Here, by the liquid discharging head 404 being driven in accordance with an image signal along with moving of the carriage 403 in the main-scanning direction, the liquids are discharged onto the paper sheet 410 that is being stopped to form an image on the paper sheet 410.

In this way, the inkjet printing apparatus including the liquid discharging head can form a high-quality image stably.

Next, another example of the liquid discharging unit of the present disclosure will be described with reference to FIG. 5. FIG. 5 is a front view of a liquid discharging unit of an inkjet printing apparatus.

This liquid discharging unit includes a liquid discharging head 404 in which a flow path member 444 is attached, and tubes 456 coupled to the flow path member 444.

The flow path member 444 is disposed inside a cover 442. A head tank 441 may be included instead of the flow path member 444. A connector 443 for electrical coupling with the liquid discharging head 404 is disposed on top of the flow path member 444.

In the present disclosure, the inkjet printing apparatus is an apparatus including a liquid discharging head or a liquid discharging unit and configured to drive the liquid discharging head to discharge a liquid. Inkjet printing apparatuses include not only apparatuses capable of discharging liquids onto articles to which liquids can be attached, but also apparatuses configured to discharge liquids into gases or liquids.

The inkjet printing apparatus may include units relating to feeding, conveying, and ejection of an article to which a liquid can be attached, a pre-processing device, a postprocessing device, etc.

The inkjet printing apparatus is not limited to production of meaningful visible images such as texts and figures with a liquid discharged.

"Articles to which liquids can be attached" refer to articles to which liquids can be attached at least temporarily, and which can have the liquids attached and adhere or attached and permeate. Specific examples of the articles include print media such as paper sheets, printing paper, printing sheets, films, and cloth, and include all articles to which liquids can be attached unless particularly limited.

Materials of the "articles to which liquids can be attached" may be anything so long as liquids can be attached at least temporarily, such as paper, yarn, fiber, fabric, leather, metals, plastics, glass, wood, and ceramics.

For example, there is a liquid discharging unit obtained by integrating a liquid discharging head and a head tank, like the liquid discharging unit 440 illustrated in FIG. 3. There is another liquid discharging unit obtained by coupling and integrating a liquid discharging head and a head tank with each other through a tube. Here, a unit including a filter may be added between the head tank and the liquid discharging head in these liquid discharging units.

There is yet another liquid discharging unit obtained by integrating a liquid discharging head and a carriage.

There is still another liquid discharging unit obtained by integrating a liquid discharging head and a scanning moving mechanism in a manner that the liquid discharging head is supported in a movable manner on a guide member constituting a part of the scanning moving mechanism. There is yet another liquid discharging unit obtained by integrating a liquid discharging head, a carriage, and a main-scanning moving mechanism, as illustrated in FIG. 3.

There is yet another liquid discharging unit obtained by integrating a liquid discharging head and a supplying mechanism through a tube coupled to the liquid discharging head in which a head tank or a flow path member is attached, as illustrated in FIG. 5.

Examples of the main-scanning moving mechanism include a mechanism formed only of a guide member. Examples of the supplying mechanism include a mechanism formed only of a tube and a mechanism formed only of a loading section.

A pressure generating unit used in the "liquid discharging head" is not limited. For example, the liquid discharging head may use not only a piezoelectric actuator (which may use a layered piezoelectric element) as described in the foregoing embodiment, but also a thermal actuator using a thermoelectric transducer such as a heating resistor, and an electrostatic actuator formed of a vibration plate and a counter electrode.

EXAMPLES

The present disclosure will be described below more specifically by way of Examples. However, the present disclosure should not be construed as being limited to the Examples.

Relative mobility of coloring materials used in Examples and Comparative Examples below was measured in the manner described below.

<Relative Mobility of Coloring Material>

Relative mobility of the coloring materials was calculated according to the procedures (1) to (4) below.

(1) A thin-layer chromatography (TLC) plate for development (product name: UNMODIFIED SILICA GEL TLC PLATE available from Merck & Co., Inc., with an average layer thickness of 200 micrometers, a plastic sheet) was used. As a developing solvent, the same organic solvent as the organic solvent used in Examples and Comparative Examples, i.e., an organic solvent obtained by mixing glycerin, 1,3-propanediol, and 2-pyrrolidone at a mixing ratio by mass of 10:30:1 was used.

(2) An evaluation sample liquid (0.5 microliters) obtained by diluting a measuring target coloring material with pure water to a concentration of 0.5 percent by mass was applied on the TLC plate.

(3) After the applied evaluation sample liquid was dried sufficiently, the TLC plate was adapted to stream of a development layer containing the developing solvent and then immersed in the developing solvent for development for 15 hours.

(4) After the development, the TLC plate was dried sufficiently, and the developed TLC plate was scanned with a scanner for imaging. The obtained image was analyzed with image analyzing software (with a software name: IMAGE J) to calculate the Rf value of the coloring material.

The Rf value of the coloring material was calculated as the average of Rf values of respective spots (P) each calculated according to the formula (1) below.

$Rf$ value of the coloring material at each spot $(P)$=
[{(spot width $(W)$)×(unit length $(L)$)/(area $(S)$ of a whole spot)}×(distance $(A)$ from the start line $(D)$)]/(distance $(B)$ from the start line $(D)$ to the leading end of the developing solvent)     Formula (1)

Using the image analyzing software: IMAGE J, the unit length (L) used in the formula (1) was determined to be 63.5 micrometers from a 400 dpi scanner image of the TLC plate.

FIG. 7 illustrates the image of the TLC plate on which coloring materials were developed by thin-layer chromatography. In FIG. 7, the numeral 1 indicates the compound (K-I), the numeral 2 indicates C.I. Direct Black 168, Li salt, the numeral 3 indicates a black dye 1, the numeral 4 indicates the compound (C-I), the numeral 5 indicates the compound (C-II), the numeral 6 indicates C.I. Direct Blue 199, the numeral 7 indicates C.I. Acid Red 52, the numeral 8 indicates the compound (M-I), the numeral 9 indicates the compound (M-II), the numeral 10 indicates the compound (Y-I), the numeral 11 indicates C.I. Direct Yellow 132, and the numeral 12 indicates C.I. Direct Yellow 142.

(Ink Production Example 1)
<Production of Ink 1>

Glycerin (10.0 percent by mass), 1,3-propanediol (30.0 percent by mass), 2-pyrrolidone (1.0 percent by mass), polyoxyalkylene alkyl ether (product name: EMULGEN LS-106 available from Kao Corporation, with an amount of active ingredient of 100 percent by mass) (0.3 percent by mass), a pH regulator (2-aminoethylpropanediol available from Tokyo Chemical Industry Co., Ltd.) (0.5 percent by mass), and a fungicide (product name: PROXEL LV available from Lonza Japan Ltd.) (0.2 percent by mass) were mixed and stirred for 30 minutes to obtain a uniform mixture liquid. The compound (K-I) presented below (a black dye) (5.0 percent by mass) (an active ingredient content) and water (balance) were added to the mixture liquid, followed by stirring for 30 minutes. After this, the resultant was subjected to pressure filtration through a cellulose acetate membrane filter (product name: DISMIC 25CS080AS available from Toyo Roshi Kaisha, Ltd.) having an average pore diameter of 0.8 micrometers to remove coarse particles, to produce an ink 1. The composition is presented in Table 1.

(Compound K-I))

[Chem. 10]

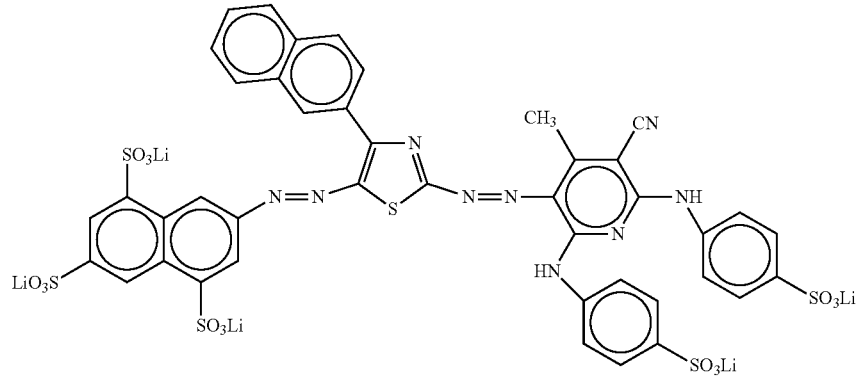

(Ink Production Examples 2 to 12)
<Production of Inks 2 to 12>

Inks 2 to 12 were produced in the same manner as in the ink production example 1, except that the kind and content of the coloring material used in the ink production example 1 were changed to the kinds and contents of coloring materials in Table 1. The kinds of the coloring materials and the relative mobilities (Rf values) of the coloring materials are presented in Table 1 and Table 2. The contents of the components presented in Table 1 and Table 2 are active ingredient contents.

TABLE 1

| | | | Rf | Ink | | | | | |
| | Hue | Kind | value | 1 | 2 | 3 | 4 | 5 | 6 |
| --- | --- | --- | --- | --- | --- | --- | --- | --- | --- |
| Coloring material | Black | Component (K-I) | 0.83 | 5.0 | — | — | — | — | — |
| | | C.I. Direct Black 168, Li salt | 0.91 | — | 5.0 | — | — | — | — |
| | | Black dye 1 | 0.92 | — | — | 5.0 | — | — | — |
| | Cyan | Compound (C-I) | 0.92 | — | — | — | 5.0 | — | — |
| | | Compound (C-II) | 0.34 | — | — | — | — | 3.5 | — |
| | | C.I. Direct Blue 199 | 0.93 | — | — | — | — | — | 4.0 |
| | Magenta | C.I. Acid Red 52 | 0.95 | — | — | — | — | — | — |
| | | Compound (M-I) | 0.93 | — | — | — | — | — | — |
| | | Compound (M-II) | 0.96 | — | — | — | — | — | — |

TABLE 1-continued

|  |  |  | Rf value | Ink |  |  |  |  |  |
|---|---|---|---|---|---|---|---|---|---|
|  | Hue | Kind |  | 1 | 2 | 3 | 4 | 5 | 6 |
|  | Yellow | Compound (Y-I) | 0.85 | — | — | — | — | — | — |
|  |  | C.I. Direct Yellow 132 | 0.94 | — | — | — | — | — | — |
|  |  | C.I. Direct Yellow 142 | 0.95 | — | — | — | — | — | — |
| Organic solvent |  | Glycerin |  | 10.0 | 10.0 | 10.0 | 10.0 | 10.0 | 10.0 |
|  |  | 1,3-propanediol |  | 30.0 | 30.0 | 30.0 | 30.0 | 30.0 | 30.0 |
|  |  | 2-pyrrolidone |  | 1.0 | 1.0 | 1.0 | 1.0 | 1.0 | 1.0 |
| Common component |  | Polyoxyalkylene alkyl ether |  | 0.3 | 0.3 | 0.3 | 0.3 | 0.3 | 0.3 |
|  |  | 2-aminoethylpropanediol |  | 0.5 | 0.5 | 0.5 | 0.5 | 0.5 | 0.5 |
|  |  | PROXEL LV |  | 0.2 | 0.2 | 0.2 | 0.2 | 0.2 | 0.2 |
|  |  | Water |  | balance | balance | balance | balance | balance | balance |
|  | Total (percent by mass) |  |  | 100 | 100 | 100 | 100 | 100 | 100 |

TABLE 2

|  |  |  | Rf value | Ink |  |  |  |  |  |
|---|---|---|---|---|---|---|---|---|---|
|  | Hue | Kind |  | 7 | 8 | 9 | 10 | 11 | 12 |
| Coloring material | Black | Component (K-I) | 0.83 | — | — | — | — | — | — |
|  |  | C.I. Direct Black 168, Li salt | 0.91 | — | — | — | — | — | — |
|  |  | Black dye 1 | 0.92 | — | — | — | — | — | — |
|  | Cyan | Compound (C-I) | 0.92 | — | — | — | — | — | — |
|  |  | Compound (C-II) | 0.34 | — | — | — | — | — | — |
|  |  | C.I. Direct Blue 199 | 0.93 | — | — | — | — | — | — |
|  | Magenta | C.I. Acid Red 52 | 0.95 | 1.5 | — | — | — | — | — |
|  |  | Compound (M-I) | 0.93 | — | 5.0 | — | — | — | — |
|  |  | Compound (M-II) | 0.96 | — | — | 2.6 | — | — | — |
|  | Yellow | Compound (Y-I) | 0.85 | — | — | — | 2.6 | — | — |
|  |  | C.I. Direct Yellow 132 | 0.94 | — | — | — | — | 3.0 | — |
|  |  | C.I. Direct Yellow 142 | 0.95 | — | — | — | — | — | 3.0 |
| Organic solvent |  | Glycerin |  | 10.0 | 10.0 | 10.0 | 10.0 | 10.0 | 10.0 |
|  |  | 1,3-propanediol |  | 30.0 | 30.0 | 30.0 | 30.0 | 30.0 | 30.0 |
|  |  | 2-pyrrolidone |  | 1.0 | 1.0 | 1.0 | 1.0 | 1.0 | 1.0 |
| Common component |  | Polyoxyalkylene alkyl ether |  | 0.3 | 0.3 | 0.3 | 0.3 | 0.3 | 0.3 |
|  |  | 2-aminoethylpropanediol |  | 0.5 | 0.5 | 0.5 | 0.5 | 0.5 | 0.5 |
|  |  | PROXEL LV |  | 0.2 | 0.2 | 0.2 | 0.2 | 0.2 | 0.2 |
|  |  | Water |  | balance | balance | balance | balance | balance | balance |
|  | Total (percent by mass) |  |  | 100 | 100 | 100 | 100 | 100 | 100 |

Supplier names, product names, and compounds in Table 1 and Table 2 are as follows.

C.I. Direct Black 168, Li salt: available from Clariant Japan Co., Ltd.

Black dye 1: available from Fujifilm Corporation, product name: FUJIFILM PRO-JET FAST BLACK 2 CF1 LIQ.

Compound (C-I):
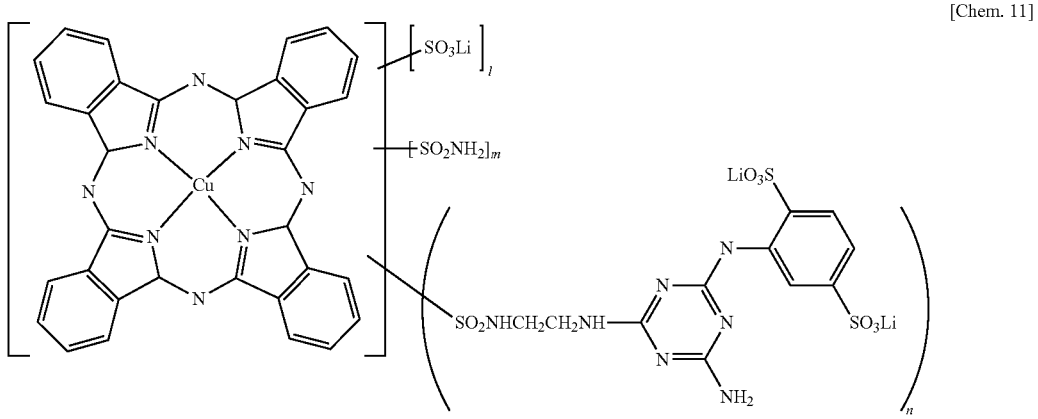
In the compound (C-I), "l" is 0.3, "m" is 2.3, and "n" is 1.4.
Compound (C-II):
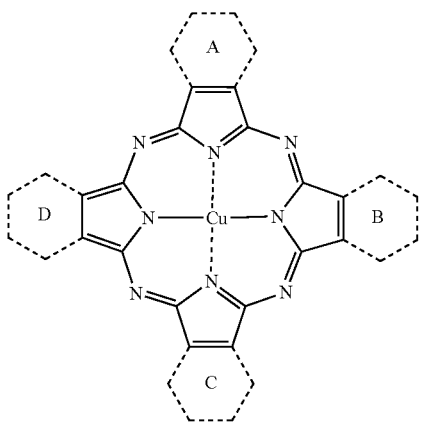
Two of A to D are the following:
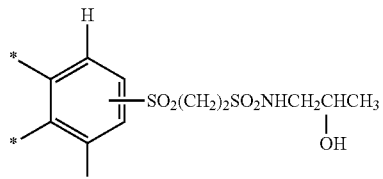
Remaining two are the following:
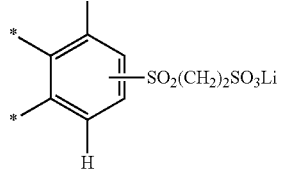
The sign * represents a position at which a phthalocyanine ring is bonded.
C.I. Direct Blue 199: available from Fujifilm Corporation
C.I. Acid Red 52: available from Fujifilm Corporation
Compound (M-I):
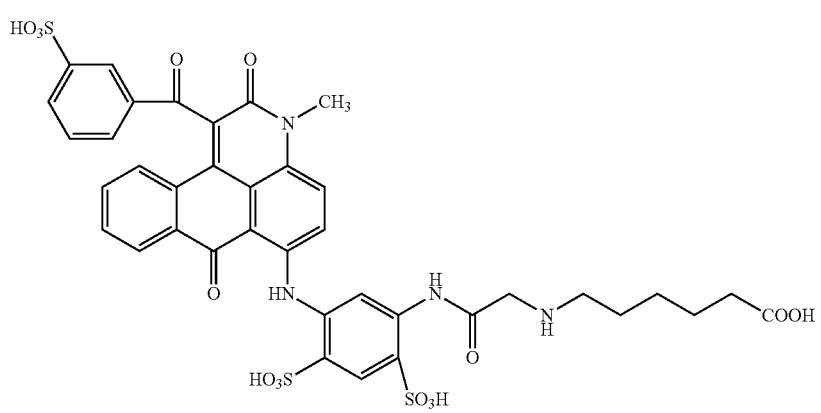

Compound (M-II):

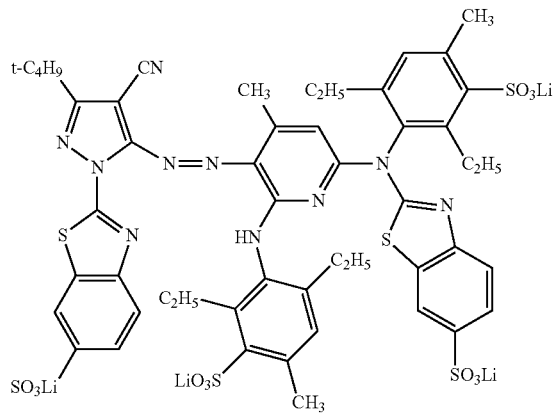

Compound (Y-I):

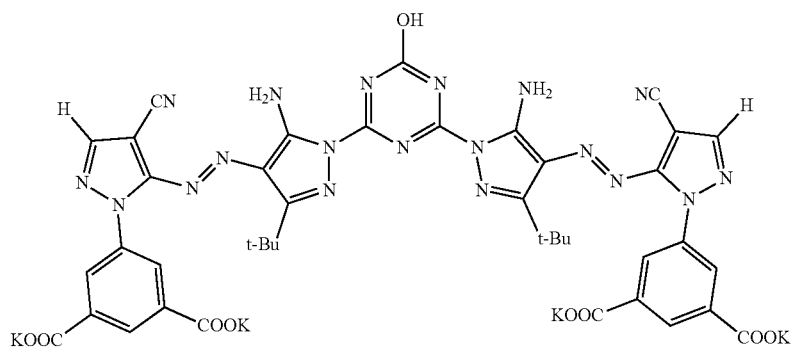

In the compound (Y-I), "t-Bu" represents a tert-butyl group.
C.I. Direct Yellow 132: available from JPD
C.I. Direct Yellow 142: available from JPD
PROXEL LV: a fungicide available from Lonza Japan Ltd.

Example 1

Ink 1 (black ink), Ink 5 (cyan ink), Ink 9 (magenta ink), and Ink 10 (yellow ink) obtained above were combined as an ink set 1.

Examples 2 and 3 and Comparative Examples 1 to 3

Ink sets 2 to 6 were obtained in the same manner as in Example 1, except that the combination of the inks in Example 1 was changed to combinations of inks presented in Table 3 and Table 4.

TABLE 3

| | Example | | | | | |
|---|---|---|---|---|---|---|
| | 1 | | 2 | | 3 | |
| Ink hue | Kind of ink | Rf value of coloring material | Kind of ink | Rf value of coloring material | Kind of ink | Rf value of coloring material |
| Black | Ink 1 | 0.83 | Ink 2 | 0.91 | Ink 1 | 0.83 |
| Cyan | Ink 5 | 0.34 | Ink 5 | 0.34 | Ink 4 | 0.92 |
| Magenta | Ink 9 | 0.96 | Ink 8 | 0.93 | Ink 7 | 0.95 |
| Yellow | Ink 10 | 0.85 | Ink 12 | 0.95 | Ink 10 | 0.85 |
| Maximum relative mobility among coloring materials | | 0.96 | | 0.95 | | 0.95 |
| Minimum relative mobility among coloring materials | | 0.34 | | 0.34 | | 0.83 |
| Relative mobility difference (maximum − minimum) | | 0.62 | | 0.62 | | 0.12 |
| Minimum difference among cyan, magenta, and yellow | | 0.11 | | 0.03 | | 0.03 |

TABLE 4

| Ink hue | Comparative Example 1 | | Comparative Example 2 | | Comparative Example 3 | |
|---|---|---|---|---|---|---|
| | Kind of ink | Rf value of coloring material | Kind of ink | Rf value of coloring material | Kind of ink | Rf value of coloring material |
| Black | Ink 3 | 0.92 | Ink 2 | 0.91 | Ink 3 | 0.92 |
| Cyan | Ink 4 | 0.92 | Ink 6 | 0.93 | Ink 4 | 0.92 |
| Magenta | Ink 9 | 0.96 | Ink 8 | 0.93 | Ink 8 | 0.93 |
| Yellow | Ink 12 | 0.95 | Ink 10 | 0.85 | Ink 11 | 94 |
| Maximum relative mobility among coloring materials | | 0.96 | | 0.93 | | 0.94 |
| Minimum relative mobility among coloring materials | | 0.92 | | 0.85 | | 0.92 |
| Relative mobility difference (maximum − minimum) | | 0.04 | | 0.07 | | 0.03 |
| Minimum difference among cyan, magenta, and yellow | | 0.01 | | 0.00 | | 0.01 |

Next, how small a color difference in images was was evaluated in the manner described below using the ink sets. The results are presented in Table 5.

<Image Color Difference>

In a printer (available from Ricoh Company, Ltd., IPSIO GX E5500), pure water was passed through an ink supplying path including a printing head for washing and sufficiently passed until the washing liquid would no longer be colored. The apparatus was used as a printing apparatus for evaluation after the liquid was completely removed from the apparatus. Each ink used in the ink sets was stirred under a reduced pressure condition of 5 Pa or higher but 10 Pa or lower for 30 minutes for degassing, and an ink stored container (ink cartridge) was filled with the ink and used as an ink cartridge for evaluation. The printing apparatus for evaluation was loaded with the ink cartridge to be replenished with the ink, and left to stand overnight. Next, in an environment in which a temperature was 23 degrees C. and a humidity was 40 percent RH, blue (0,0,255 in RGB numeric representation), red (255,0,0 in RGB numeric representation), green (0,255,0 in RGB numeric representation), and gray (127,127,127 in RGB numeric representation) were printed on paper (product name: KASSAI PHOTO FINISH PRO available from Fujifilm Corporation) under the inkjet printing conditions (1) to (3) described below such that a patch image in which each color had a size of 6 cm×6 cm would be obtained, to obtain a patch image. The obtained patch image was subjected to colorimetry at 9 points with a spectrophotometric colorimeter (product name: X-RITE 939 available from X-Rite Inc.) to calculate a color difference. How small the color difference in the image was was evaluated according to the evaluation criteria described below.

<Printing Conditions (1) to (3)>

Printing condition (1): bidirectional printing at 1,200 dpi×1,200 dpi through 4 times of reciprocating main-scanning printing at a printing speed of 8.2 cm²/sec Printing condition (2): bidirectional printing at 1,200 dpi×1,200 dpi through 2 times of reciprocating main-scanning printing at a printing speed of 16.6 cm²/sec Printing condition (3): bidirectional printing at 600 dpi× 600 dpi through 1 time of reciprocating main-scanning printing at a printing speed of 33.2 cm²/sec —Evaluation criteria—

A: ΔE was 3 or less.
B: ΔE was greater than 3 but 7 or less.
C: ΔE was greater than 7 but 11 or less.
D: ΔE was greater than 11.

TABLE 5

| Printing condition | Number of times of reciprocating main-scanning printing (time) | Resolution (dpi) | Printing speed (cm²/sec) | Examples 1 | 2 | 3 | Comparative Example 1 | 2 | 3 |
|---|---|---|---|---|---|---|---|---|---|
| (1) | 4 | 1,200 × 1,200 | 8.2 | A | A | A | D | D | D |
| (2) | 2 | 1,200 × 1,200 | 16.6 | A | A | C | D | D | D |
| (3) | 1 | 600 × 600 | 33.2 | A | B | C | D | D | D |

From the results presented above, it can be seen that bidirectional printing using the ink sets of Examples was able to suppress color difference in the images obtained.

Aspects of the present disclosure are as follows, for example.

<1> An ink set including
at least two inks,
each of the at least two inks including a coloring material, an organic solvent, and water,
wherein a proportion of the organic solvent in each of the at least two inks is 30 percent by mass or greater,
wherein a relative mobility difference (maximum relative mobility−minimum relative mobility) between a maximum relative mobility and a minimum relative mobility among relative mobilities of the coloring materials included in the at least two inks is 0.1 or greater, where the relative mobilities are obtained by thin-layer chromatography in which the coloring materials are developed using the organic solvents included in the at least two inks as developing solvents.

<2> The ink set according to <1>,
wherein the relative mobility difference (maximum relative mobility−minimum relative mobility) is 0.5 or greater.
<3> The ink set according to <1> or <2>,
wherein the at least two inks include a cyan ink including a cyan dye, a magenta ink including a magenta dye, and a yellow ink including a yellow dye, and
wherein a difference between any two of a relative mobility of the cyan dye, a relative mobility of the magenta dye, and a relative mobility of the yellow dye is 0.1 or greater, where the relative mobility of the cyan dye, the relative mobility of the magenta dye, and the relative mobility of the yellow dye are obtained by thin-layer chromatography in which the cyan dye, the magenta dye, and the yellow dye are developed using the organic solvents as developing solvents.
<4> The ink set according to any one of <1> to <3>,
wherein the ink set is used in bidirectional printing by an inkjet method.
<5> The ink set according to any one of <1> to <4>,
wherein a proportion of the coloring material in each of the at least two inks is 0.1 percent by mass or greater but 15 percent by mass or less.
<6> The ink set according to any one of <1> to <5>,
wherein the organic solvents are glycerin, 1,3-propanediol, and 2-pyrrolidone.
<7> The ink set according to <6>,
wherein a ratio by mass (glycerin:1,3-propanediol:2-pyrrolidone) among a proportion (percent by mass) of the glycerin, a proportion (percent by mass) of the 1,3-propanediol, and a proportion (percent by mass) of the 2-pyrrolidone is 10:30:1.
<8> The ink set according to any one of <1> to <7>,
wherein the proportion of the organic solvent in each of the at least two inks is 30 percent by mass or greater but 60 percent by mass or less.
<9> The ink set according to any one of <1> to <8>,
wherein the proportion of the organic solvent in each of the at least two inks is 40 percent by mass or greater but 60 percent by mass or less.
<10> The ink set according to any one of <1> to <9>,
wherein the coloring materials are dyes.
<11> The ink set according to any one of <1> to <10>,
wherein each of the at least two inks further includes a surfactant.
<12> An ink stored container including:
any one of the at least two inks used in the ink set according to any one of <1> to <11>; and
a container storing the any one of the at least two inks.
<13> An inkjet printing method including
an ink discharging step of applying a stimulus to the at least two inks used in the ink set according to any one of <1> to <11> to discharge the at least two inks to print an image on a print medium.
<14> The inkjet printing method according to <13>,
wherein the inkjet printing method performs bidirectional printing by an inkjet method.
<15> The inkjet printing method according to <13> or <14>,
wherein for forming the image on the print medium, the inkjet printing method performs reciprocating main-scanning printing 4 times or less for a same region of the image.
<16> The inkjet printing method according to <15>,
wherein for forming the image on the print medium, the inkjet printing method performs reciprocating main-scanning printing twice or less for a same region of the image.
<17> The inkjet printing method according to any one of <13> to <16>,
wherein a printing speed is 8.0 $cm^2$/sec or higher.
<18> An inkjet printing apparatus including
an ink discharging unit configured to apply a stimulus to the at least two inks used in the ink set according to any one of <1> to <11> to discharge the at least two inks onto a print medium.
<19> The inkjet printing apparatus according to <18>, further including:
a printing head including a plurality of printing sections configured to print the at least two inks all over an entire range, in one direction, of an image formation region; and
a main-scanning driving section configured to drive at least one of the printing head and the print medium and perform reciprocating main-scanning printing.
<20> The inkjet printing apparatus according to <19>,
wherein the inkjet printing apparatus performs the reciprocating main-scanning printing 4 times or less for a same region of an image.

The ink set according to any one of <1> to <11>, the ink stored container according to <12>, the inkjet printing method according to any one of <13> to <17>, and the inkjet printing apparatus according to any one of <18> to <20> can solve the various problems in the related art and can achieve the object of the present disclosure.

The invention claimed is:

1. An ink set, comprising:
at least two kinds of inks,
wherein each of the at least kinds of inks comprises a coloring material, an organic solvent, and water,
wherein a proportion of the organic solvent in each of the at least two kinds of inks is 30 percent by mass or greater,
wherein a relative mobility difference between a maximum relative mobility and a minimum relative mobility among relative mobilities of the coloring material in the at least two kinds of inks is 0.5 or greater, where relative mobilities are obtained by thin-layer chromatography in which the coloring material is developed using the organic solvent in the at least two kinds of inks as developing solvents, and
wherein the at least two kinds of inks comprise:
a black ink that comprises a black dye
wherein a relative mobility of the black dye is in a range of from 0.83 to 0.91.

2. The ink set according to claim 1,
wherein the at least two kinds of inks further comprise:
a cyan ink that comprises a cyan dye,
a magenta ink that comprises a magenta dye, and
a yellow ink that comprises a yellow dye, and
wherein a difference between any two of a relative mobility of the cyan dye, a relative mobility of the magenta dye, and a relative mobility of the yellow dye is 0.5 or greater, where the relative mobility of the cyan dye, the relative mobility of the magenta dye, and the relative mobility of the yellow dye are obtained by thin-layer chromatography in which the cyan dye, the magenta dye, and the yellow dye are developed using the organic solvent as developing solvents.

3. The ink set according to claim 1,
which is suitable for bidirectional printing by an inkjet method.

4. An ink stored container, comprising:
at least two kinds of inks; and
a container storing the at least two kinds of inks;
wherein each of the at least two kinds of inks comprises a coloring material, an organic solvent, and water, wherein a proportion of the organic solvent in each of the at least kinds of inks is 30 percent by mass or greater, wherein a relative mobility difference between a maximum relative mobility and a minimum relative mobility among relative mobilities of the coloring material in the at least two kinds of inks is 0.5 or greater, where relative mobilities are obtained by thin-layer chromatography in which the coloring material is developed using the organic solvent included in the at least two kinds of inks as developing solvents, and wherein the at least two kinds of inks comprise:

a black ink that comprises a black dye wherein a relative mobility of the black dye is in a range of from 0.83 to 0.91.

5. An inkjet printing method with the ink set according to claim 1, the inkjet printing method comprising:

applying a stimulus to the at least two kinds of inks to discharge the at least two kinds of inks to print an image on a print medium, wherein a printing speed is 8.0 cm$^2$/sec or higher.

6. The inkjet printing method according to claim 5, wherein the inkjet printing method performs bidirectional printing by an inkjet method.

7. The inkjet printing method according to claim 5, wherein for forming the image on the print medium, the inkjet printing method performs reciprocating main-scanning printing 4 times or less for a same region of the image.

8. The inkjet printing method according to claim 7, wherein for forming the image on the print medium, the inkjet printing method performs reciprocating main-scanning printing twice or less for a same region of the image.

9. An inkjet printing apparatus, comprising:

an ink discharging unit configured to apply a stimulus to at least two kinds of inks to discharge the at least two kinds of inks onto a print medium, wherein each of the at least two kinds of inks comprises a coloring material, an organic solvent, and water, wherein a proportion of the organic solvent in each of the at least two kinds of inks is 30 percent by mass or greater, wherein a relative mobility difference between a maximum relative mobility and a minimum relative mobility among relative nobilities of the coloring material in the at least two kinds of inks is 0.5 or greater, where relative mobilities are obtained by thin-layer chromatography in which the coloring material is developed using the organic solvent in the at least two kinds of inks as developing solvents, and wherein the at least two kinds of inks comprise:

a black ink that comprises a black dye wherein a relative mobility of the black dye is in a range of from 0.83 to 0.91.

10. The inkjet printing apparatus according to claim 9, further comprising:

a printing head that comprises a plurality of printing sections configured to print the at least two kinds of inks all over an entire range, in one direction, of an image formation region; and a main-scanning driving section configured to drive at least one of the printing head and the print medium and perform reciprocating main-scanning printing.

11. The inkjet printing apparatus according to claim 10, wherein the inkjet printing apparatus performs the reciprocating main-scanning printing 4 times or less for a same region of an image.

12. The ink set according to claim 1, wherein the organic solvent comprises glycerin, 1,3-propanediol, and 2-pyrrolidone.

13. The ink set according to claim 1, wherein the at least two kinds of inks further comprise:

a cyan ink that comprises a cyan dye, a magenta ink that comprises a magenta dye, and a yellow ink that comprises a yellow dye, and a relative mobility of the cyan dye is 0.34.

14. The ink set according to claim 1, wherein the at least two kinds of inks further comprise:

a cyan ink that comprises a cyan dye, a magenta ink that comprises a magenta dye, and a yellow ink that comprises a yellow dye, and a relative mobility of the yellow dye is 0.85 and a relative mobility of the magenta dye is in a range of from 0.95 to 0.96.

15. The inkjet printing method according to claim 5, wherein the printing speed is 16.6 cm$^2$/sec or higher.

* * * * *